US011420880B2

(12) United States Patent
Holtz et al.

(10) Patent No.: US 11,420,880 B2
(45) Date of Patent: Aug. 23, 2022

(54) STORMWATER FILTRATION SYSTEM WITH INTERNAL BYPASS PIPE

(71) Applicant: Oldcastle Infrastructure, Inc., Atlanta, GA (US)

(72) Inventors: James Ferguson Holtz, Portland, OR (US); Christopher Ryan Demarest, Livermore, CA (US)

(73) Assignee: Oldcastle Infrastructure, Inc., Atlanta, GA (US)

( * ) Notice: Subject to any disclaimer, the term of this patent is extended or adjusted under 35 U.S.C. 154(b) by 4 days.

(21) Appl. No.: 16/756,742

(22) PCT Filed: Oct. 17, 2018

(86) PCT No.: PCT/US2018/056356
§ 371 (c)(1),
(2) Date: Apr. 16, 2020

(87) PCT Pub. No.: WO2019/079502
PCT Pub. Date: Apr. 25, 2019

(65) Prior Publication Data
US 2021/0070631 A1 Mar. 11, 2021

Related U.S. Application Data

(60) Provisional application No. 62/573,975, filed on Oct. 18, 2017.

(51) Int. Cl.
*C02F 1/00* (2006.01)
*E03F 5/14* (2006.01)
(Continued)

(52) U.S. Cl.
CPC ............... *C02F 1/001* (2013.01); *E03F 5/14* (2013.01); *E03F 5/16* (2013.01); *C02F 2103/001* (2013.01); *C02F 2301/043* (2013.01)

(58) Field of Classification Search
CPC .................... C02F 2103/001; C02F 1/001; C02F 2307/08; E03F 5/0404; E03F 5/14;
(Continued)

(56) References Cited

U.S. PATENT DOCUMENTS 3,770,623 A 11/1973 Seidel
4,537,687 A 8/1985 Piper
(Continued)

FOREIGN PATENT DOCUMENTS

WO WO 2010/118110 A9 10/2010
WO WO 2019/079502 A1 4/2019

OTHER PUBLICATIONS

PCT Notification of Transmittal of the International Search Report and Written Opinion of the International Searching Authority, or the Declaration for International application No. PCT/US2018/056356, dated Jan. 8, 2019 (15 pages).
(Continued)

*Primary Examiner* — Claire A Norris

(57) ABSTRACT

Structures, methods, and assemblies for stormwater management systems with one or more internal bypass features incorporated into a vault-shaped enclosure are described, along with methods and additional structures that are useful for managing stormwater flow and inhibiting the flow of pollutants, debris, and other contaminants into drainage systems. A first compartment disposed within the vault and comprising a removable bypass pipe, a baffle wall adjacent to the bypass pipe, a screened floatables baffle attached to the baffle wall, and a fluid-conveyance opening disposed along the baffle wall are described. A fluid-conveyance opening is located below the top of a bypass pipe, and a second compartment is in fluid communication with the first compartment through the fluid-conveyance opening. A second compartment is adapted to incorporate a filtration cartridge. An underdrain defined at least in part by the upper
(Continued)

and lower floor slabs of the vault is disposed below and in fluid communication with the first compartment through the bypass pipe.

20 Claims, 8 Drawing Sheets

(51) Int. Cl.
   *E03F 5/16* (2006.01)
   *C02F 103/00* (2006.01)
(58) Field of Classification Search
   CPC ....... E03F 1/00; E03F 5/16; E03F 5/12; E03F 1/005; E03F 1/003
   USPC .............................. 210/170.03, 254, 474.2
   See application file for complete search history.

(56) References Cited

U.S. PATENT DOCUMENTS

| | | | |
|---|---|---|---|
| 5,322,629 A | 6/1994 | Stewart | |
| 5,433,845 A * | 7/1995 | Greene | B01D 17/0208 |
| | | | 210/170.03 |
| 5,437,786 A | 8/1995 | Horsley | |
| 5,549,817 A | 8/1996 | Horsley | |
| 5,569,387 A | 10/1996 | Bowne et al. | |
| 5,624,576 A | 4/1997 | Lenhart | |
| 5,632,889 A | 5/1997 | Tharp | |
| 5,702,593 A | 12/1997 | Horsley | |
| 5,707,527 A | 1/1998 | Knutson | |
| 5,728,305 A | 3/1998 | Hawkinson | |
| 5,744,048 A | 4/1998 | Stetler | |
| 5,759,415 A | 6/1998 | Adams | |
| 5,788,848 A | 8/1998 | Blanche | |
| 5,985,157 A | 11/1999 | Leckner | |
| 6,027,639 A | 2/2000 | Lenhart, Jr. | |
| 6,077,423 A | 6/2000 | Roy et al. | |
| 6,132,603 A | 10/2000 | Mokrzycki et al. | |
| 6,241,882 B1 | 6/2001 | Allard | |
| 6,277,274 B1 | 8/2001 | Coffman | |
| 6,350,374 B1 | 2/2002 | Stever | |
| 6,406,218 B1 | 6/2002 | Olson | |
| 6,511,595 B2 | 1/2003 | Crompton | |
| 6,527,477 B1 | 3/2003 | Allard | |
| 6,551,023 B2 | 4/2003 | Allard | |
| 6,569,321 B2 | 5/2003 | Coffman | |
| 6,641,335 B1 | 11/2003 | Allard | |
| 6,641,720 B1 | 11/2003 | Crompton | |
| 6,649,048 B2 | 11/2003 | de Ridder | |
| 6,676,832 B2 | 1/2004 | de Bruijn et al. | |
| 6,733,209 B2 | 5/2004 | Allard | |
| 6,783,683 B2 | 8/2004 | Collings | |
| 6,872,029 B2 | 3/2005 | Allard et al. | |
| 6,875,350 B2 | 4/2005 | Allard | |
| 6,905,599 B2 | 7/2005 | Allard | |
| 6,939,461 B2 | 9/2005 | Use et al. | |
| 6,976,808 B2 | 12/2005 | Allard | |
| 6,986,621 B2 | 1/2006 | Allard | |
| 6,991,114 B2 | 1/2006 | Allen, II | |
| 6,991,402 B2 | 1/2006 | Burkhart | |
| 6,991,734 B1 | 1/2006 | Smith et al. | |
| 6,998,038 B2 | 2/2006 | Howard | |
| 7,022,243 B2 | 4/2006 | Bryant | |
| 7,040,838 B2 | 5/2006 | Allard et al. | |
| 7,160,058 B2 | 1/2007 | Burkhart | |
| 7,165,913 B2 | 1/2007 | Allard et al. | |
| 7,182,874 B2 | 2/2007 | Allard et al. | |
| 7,186,058 B2 | 3/2007 | Schluter | |
| 7,186,333 B2 | 3/2007 | Kluge | |
| 7,237,981 B1 | 7/2007 | Vitarelli | |
| 7,296,692 B2 | 11/2007 | Allen, II | |
| 7,297,266 B2 | 11/2007 | Cobb | |
| 7,344,335 B2 | 3/2008 | Burkhart | |
| 7,374,364 B2 | 5/2008 | Allard et al. | |
| 7,425,261 B2 | 9/2008 | Siviter | |
| 7,425,262 B1 | 9/2008 | Kent | |
| 7,470,362 B2 | 12/2008 | Kent | |
| 7,517,450 B2 | 4/2009 | Hersey et al. | |
| 7,625,465 B2 | 12/2009 | Siviter | |
| 7,638,065 B2 | 12/2009 | Stever et al. | |
| 7,638,066 B1 | 12/2009 | Jacob et al. | |
| 7,674,378 B2 | 3/2010 | Kent | |
| 7,776,217 B2 | 8/2010 | Lucas | |
| 7,798,747 B1 | 9/2010 | de Bruijn et al. | |
| 7,799,235 B2 | 9/2010 | Olson et al. | |
| 7,833,412 B2 | 11/2010 | Holtz | |
| 7,985,335 B2 | 7/2011 | Allard | |
| 8,110,105 B2 | 2/2012 | Allen, II | |
| 8,147,688 B2 | 4/2012 | Adams et al. | |
| 8,501,016 B2 | 8/2013 | Lord et al. | |
| 8,535,533 B2 | 9/2013 | Allard | |
| 9,540,799 B2 | 1/2017 | Allard | |
| 2003/0121846 A1 | 7/2003 | Use et al. | |
| 2004/0226869 A1 | 11/2004 | McClure | |
| 2007/0068878 A1 | 3/2007 | Stever | |
| 2008/0121594 A1 | 5/2008 | Dierkes | |
| 2008/0217227 A1 | 9/2008 | Pank | |
| 2008/0217257 A1 | 9/2008 | Pank | |
| 2008/0251448 A1 | 10/2008 | Kent | |
| 2009/0050583 A1 | 2/2009 | Amott | |
| 2009/0218299 A1 | 9/2009 | Cote et al. | |
| 2009/0250405 A1 | 10/2009 | Allard | |
| 2010/0206790 A1 | 8/2010 | Holtz | |
| 2011/0147303 A1 | 6/2011 | Allard | |
| 2011/0168612 A1 | 7/2011 | Happel | |
| 2011/0186492 A1 | 8/2011 | Holtz | |
| 2012/0031854 A1 | 2/2012 | Allard | |
| 2012/0152827 A1 | 6/2012 | Allard | |
| 2014/0042103 A1* | 2/2014 | Allard | E03F 5/106 |
| | | | 210/747.3 |
| 2016/0176732 A1 | 7/2016 | Holtz et al. | |
| 2016/0319963 A1* | 11/2016 | Banks | E03F 7/00 |

OTHER PUBLICATIONS

PCT Notification Concerning Transmittal of Copy of International Preliminary Report on Patentability (Chapter I of the Patent Cooperation Treaty) for International application No. PCT/US2018/056356, dated Apr. 30, 2020 (8 pages).
PCT International Search Report and Written Opinion of the International Searching Authority for International application No. PCT/US10/30206, dated Jun. 10, 2010 (7 pages).
PCT Notification Concerning Transmittal of Copy of International Preliminary Report on Patentability (Chapter I of the Patent Cooperation Treaty) for International Application No. PCT.US2010/030206, dated Oct. 20, 2011 (7 pages).
PCT Notification of Transmittal of the International Search Report and the Written Opinion of the International Searching Authority, or the Declaration for International Application No. PCT/US2014/042077, dated Aug. 12, 2014 (dated Dec. 8, 2014) (11 pages).
PCT Notification Concerning Transmittal of Copy of International Preliminary Report on Patentability (Chapter I of the Patent Cooperation Treaty) for International Application No. PCT/US2014/042077, dated Dec. 23, 2015 (dated Dec. 23, 2015) (8 pages).

* cited by examiner

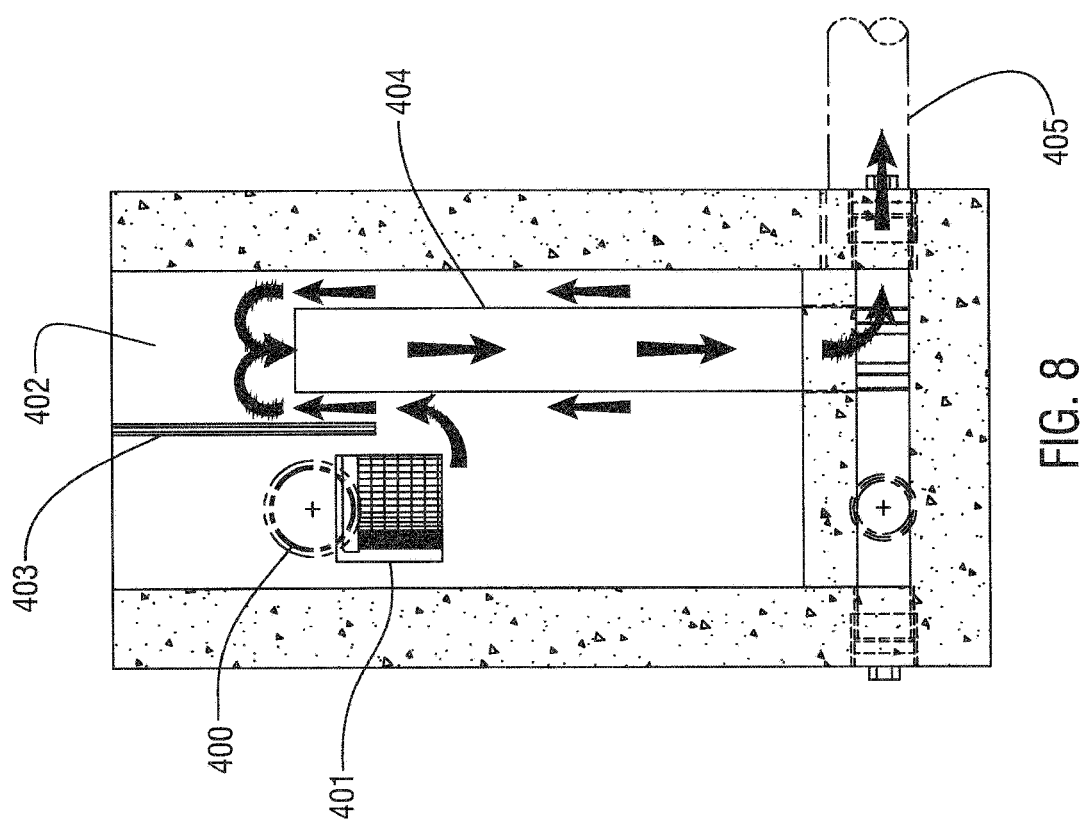

STORMWATER FILTRATION SYSTEM WITH INTERNAL BYPASS PIPE

CROSS REFERENCE TO RELATED APPLICATIONS

This application claims the benefit of International Application No. PCT/US2018/056356, filed on Oct. 17, 2018, which claims the benefit of U.S. Provisional Application No. 62/573,975, filed on Oct. 18, 2017. These prior applications, including the entire written descriptions and drawing figures, are hereby incorporated into the present application by reference in their entirety.

FIELD OF THE INVENTION

The present invention relates to systems, methods, and components that are useful for the control of stormwater runoff and the removal of pollutants, debris, and other contaminants from stormwater runoff More specifically, the present invention relates to stormwater filtration devices, underground vault systems, components, and related methods that are useful for managing stormwater flow and inhibiting the flow of pollutants, debris, and other contaminants into drainage systems.

BACKGROUND OF THE INVENTION

Impervious surfaces and other urban and suburban landscapes generate a variety of contaminants that can enter stormwater and pollute downstream receiving waters. Such surfaces and landscapes include paved streets, parking lots, and building rooftops. While flowing over the land and impervious surfaces, stormwater can pick up pollutants such as chemicals, oils, metals, dirt, sediment, and other materials. When left uncontrolled, these pollutants can be harmful to rivers, streams, lakes, and coastal waters. To protect these resources, developers, communities, construction companies, industries, and other entities are increasingly using stormwater controls or best management practices (BMPs) to filter out pollutants and/or prevent pollution by controlling the pollution at its source.

One of the concerns that has emerged is the ability of stormwater management systems to remove gross pollutants from incoming stormwater prior to releasing it. Ideally, the system should pre-treat water flow (e.g., using filtration systems) from the developed land prior to releasing it. The entrance of gross pollutants, such as trash, debris, floatables, and coarse sediments, are known to "clog" the system and thus reduce the efficiency. It also increases the maintenance frequency of typical stormwater management systems. Generally, large (normally pre-cast concrete) pre-filtration structures are installed next to or along the side of underground stormwater management systems. The pre-filtration structures may be separate structures that are connected to the stormwater management systems by piping. This type of pre-filtration structure requires additional material and labor costs. It also requires the use of more space to accommodate the pre-treatment structure that sits next to or along the side of the system. It would be advantageous, therefore, to have a pretreatment apparatus that can remove gross pollutants. It would also be advantageous for a pretreatment apparatus to be incorporated into the system in order to minimize land usage. The pretreatment apparatus also should be accessible for intermittent cleaning, repair, and/or other maintenance.

Another concern is the ability of existing stormwater filtration systems, including underground vault systems, to process large quantities of fluid during peak flow periods without backups. Such situations can result in localized flooding of the surrounding areas. Most stormwater filtration systems will have an upper limit for the amount of water that can be filtered at any given time, as well as a maximum capacity for the amount of water that can be passed through the system during an event. To address stormwater flow during periods of peak flow and increase the upper limit for fluid flow, some stormwater filtration systems employ an external high-flow bypass mechanism. This feature allows excess fluids to proceed through the drainage system without being filtered during periods of high fluid flow. This conventional high flow bypass is a separate structure and often a separate catch basin or similar device connected to the primary stormwater filtration device by an external pipe or other mechanism located downstream from the system. However, because the high-flow bypass is an external structure, its incorporation requires additional space to accommodate the external bypass structure. It may also require additional resources for the design, manufacturing, installation, labor, service, repair, replacement, and maintenance of the system.

In addition, stormwater management systems, including vault systems, typically are installed under large concrete or asphalt surfaces to treat stormwater that has run over impervious surfaces in commercial, residential, and industrial areas such as median strips, parking lots, sidewalks, swales, and other similar surfaces. They must be capable of bearing highly variable weight loads. It is desirable for the systems to maximize water storage while occupying as small a "footprint" as possible to minimize land usage and site excavation costs.

Accordingly, what is desired is a stormwater management system addressing many or all of the foregoing problems, including a stormwater management system that can effectively process increased amounts of stormwater runoff during peak periods of high fluid flow and can efficiently utilize space within a developed land site. Other advantages can be obtained as well. It is often desirable to have a stormwater management system that provides a flexible and economical design that simplifies the design and construction of stormwater drainage systems in a landscape area. Further, it may be advantageous to provide a stormwater management system that has fewer and more manageable parts that are relatively easy to maintain and service. In addition, it is often advantageous to provide a system with pre-filtration capabilities to remove gross pollutants from stormwater runoff before it is released.

BRIEF SUMMARY OF THE INVENTION

The present invention provides structures, methods, and assemblies for stormwater management systems, including underground vault-style systems, that may have one or more internal bypass features incorporated into the stormwater management system.

In one embodiment, an apparatus for stormwater management comprises a vault comprising upper and lower floor slabs. The apparatus also comprises a first compartment disposed within the vault and comprising: a bypass pipe, a baffle wall adjacent to the bypass pipe, a screened floatables baffle attached to the baffle wall, and a fluid-conveyance opening disposed along the baffle wall. The top of the bypass pipe is located above the top of the fluid conveyance opening. The apparatus further comprises a second compartment in fluid communication with the first compartment through the fluid-conveyance opening. The second compartment is adapted to incorporate a filtration cartridge. In addition, the apparatus comprises an underdrain defined at least in part by the upper and lower floor slabs of the vault. The underdrain is disposed below and in fluid communication with the first compartment through the bypass pipe.

In some embodiments, the underdrain is disposed below and in fluid communication with the second compartment. The underdrain may comprise a continuous fluid flow path under the first and second compartments. The underdrain may extend between opposite sidewalls of the vault and terminate at an outlet of the vault. The bypass pipe may comprise a structural support notch along a bottom portion. In addition, the bypass pipe may comprise a removable pipe.

In another embodiment, an apparatus for stormwater management comprises: a vault comprising an inlet, an outlet downstream from the inlet, filtration media disposed between the inlet and outlet, a primary floor disposed along a lower region of the vault, and a secondary floor disposed above the primary floor. The apparatus further comprises a lower channel formed at least in part by the primary and secondary floors of the vault, and terminating at the outlet; and a baffle wall located along an interior of the vault and upstream from the filtration media. The baffle wall comprises a fluid-conveyance window, and the fluid conveyance window is adapted to direct fluid from the inlet to the filtration media. The apparatus also comprises a standpipe located adjacent to the baffle wall. The standpipe comprises a top opening adapted to direct fluid from the inlet to the lower channel.

In another embodiment, a method for processing stormwater comprises directing stormwater through an inlet of a vault comprising upper and lower floor slabs and flowing stormwater from the inlet into a first compartment. The first compartment comprises a bypass pipe, a baffle wall adjacent to the bypass pipe, and a fluid-conveyance opening disposed along the baffle wall. The method further comprises flowing stormwater accumulating below a top portion of the bypass pipe into a second compartment, wherein the second compartment comprises a filtration cartridge; and flowing stormwater accumulating above a top portion of the bypass pipe through the bypass pipe and into an underdrain defined at least in part by the upper and lower floor slabs of the vault. The method also comprises the step of releasing stormwater from the first and second compartments through an outlet in fluid communication with the underdrain.

BRIEF DESCRIPTION OF THE SEVERAL VIEWS OF THE DRAWINGS

FIG. 8 illustrates schematically a side sectional view showing internal components of a stormwater treatment system in accordance with one embodiment of the present invention. The arrows indicate a direction in which bypass stormwater may flow through the system.

DETAILED DESCRIPTION OF THE INVENTION

Figure 1:
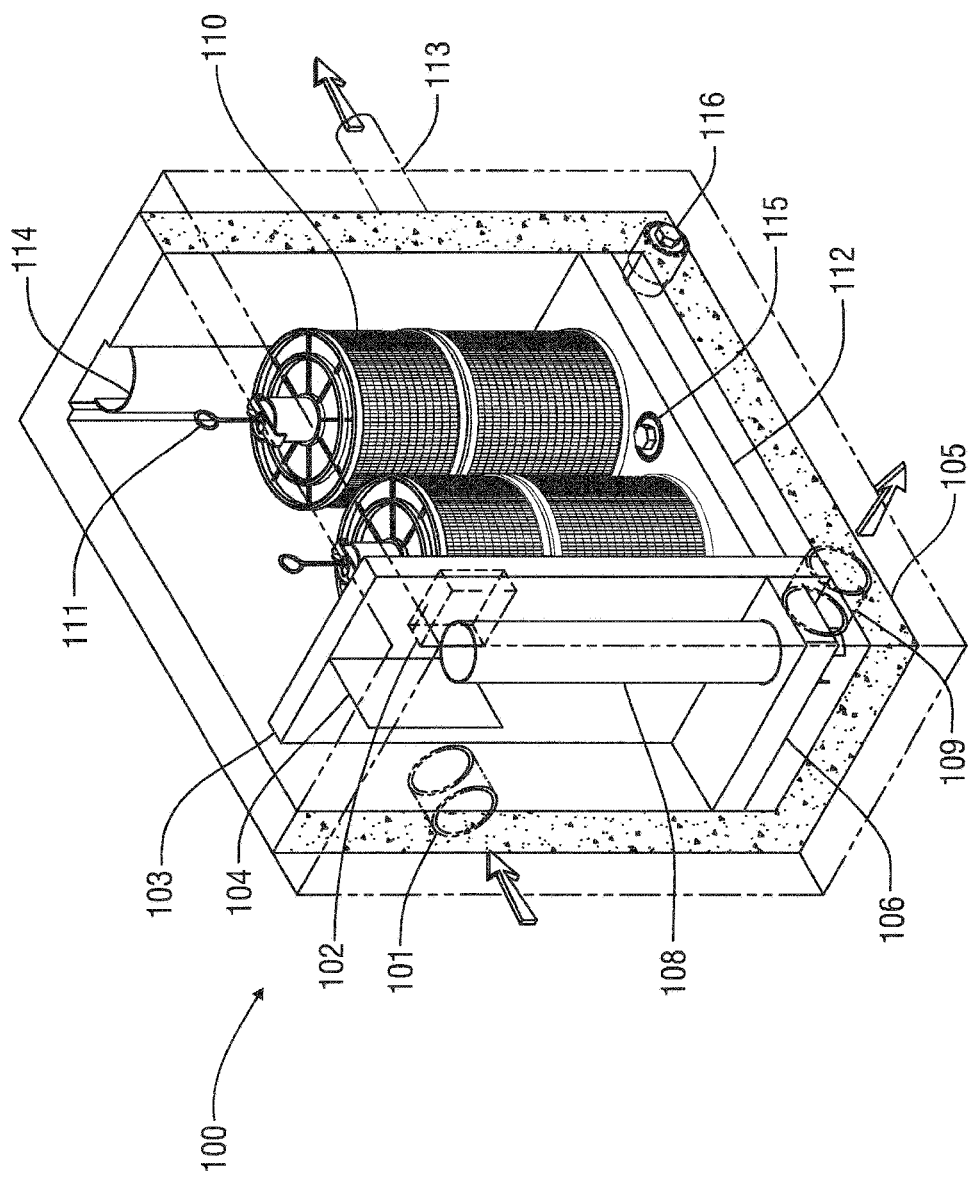
FIG. 1 illustrates schematically a cutaway view of a stormwater treatment system in accordance with one embodiment of the present invention.

As used herein, the terms "comprises," "comprising," "includes," "including," "has," "having," or any other variation thereof, are intended to cover a non-exclusive inclusion. For example, processes, methods, articles, or apparatuses that comprise a list of elements are not necessarily limited to only those elements but may include other elements not expressly listed or inherent to such processes, methods, articles, or apparatuses. Further, unless expressly stated to the contrary, "or" refers to an inclusive "or" but not to an exclusive "or." For example, a condition A or B is satisfied by any one of the following: A is true (or present) and B is false (or not present), A is false (or not present) and B is true (or present), and both A and B are true (or present).

Also, the use of "a" or "an" is employed to describe the elements and components of the invention. This is done merely for convenience and to give a general sense of the invention. This description includes one or at least one, and the singular also includes the plural unless it is obvious that it is meant otherwise.

Unless otherwise defined, technical and scientific terms used herein have the same meaning as commonly understood by one of ordinary skill in the art to which this invention belongs. Although methods that are similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, materials, methods, and examples are illustrative only and not intended to be limiting.

In the following description, numerous specific details, such as the identification of various system components, are provided to understand the embodiments of the invention. One skilled in the art will recognize, however, that embodiments of the invention can be practiced without one or more of the specific details, ordinary methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or work characteristics may be combined in any suitable manner in one or more embodiments.

Stormwater management systems, such as underground filtration devices, may be useful for the treatment of stormwater runoff in many different settings. An underground filtration device may be a vault-style structure that is designed to remove contaminants, including sediment, metals, nutrients, hydrocarbons, and the like, as well as gross pollutants and solids that are generally found in stormwater runoff. A wide variety of filtration devices, filtration media, cartridges, and/or pollution removal products that are useful for the partial or complete removal of pollutants from stormwater, either conventional or customized, may be used in the underground filtration device. The underground filtration device may be designed in various sizes, shapes, and configurations to meet particular project, manufacturing, or landscape requirements. In preferred embodiments, the underground filtration device may also include one or more optional internal high flow bypass features integrated within the structure.

As shown FIGS. 1 through 4, a stormwater management system 100 includes a substantially rectangular-shaped vault enclosure. An inlet bay is located along a front side of the enclosure. A cartridge bay is located downstream from the inlet bay. The inlet bay includes an inlet structure, such as an inlet coupler 101, that extends from the outside of the inlet bay through a sidewall in the inlet bay. The inlet structure may be formed from a pipe, coupler, or other connector that permits fluid flow from the outside of the system through an opening in the sidewall and into the inlet bay. In some embodiments, the inlet structure may be cast monolithically with the vault enclosure.

An inlet window 102 is located along a baffle wall 103. As shown in the figures, the baffle wall is located between the inlet area and an adjacent cartridge area. In other embodiments, however, the baffle also may separate the inlet area from other compartments inside the vault, such as, without limitation, additional inlet bays, intermediate bays, filtration bays, storage bays, holding areas, clean-out areas, or other types of treatment or processing areas within the vault. The baffle wall may, but need not, extend to the top of the inlet bay. The inlet window provides a path for fluid flow from the inlet bay into an adjacent compartment (here, the cartridge bay). The inlet window is shown as substantially square-shaped, but the inlet window may take a variety of shapes and sizes depending on factors such as, without limitation: ease of construction, geometries and locations of the other components of the system, the anticipated rates of fluid flow into and through the vault, the desired rate of fluid flow rates through the system, and the overall structural requirements for the system.

A screened floatables baffle 104 is positioned along the baffle wall. The screened floatables baffle comprises a permeable or semi-permeable structure, such as a mesh screen, that permits fluid flow while it restricts the flow of at least some stormwater-borne gross pollutants, such as such as trash and debris, through the floatables baffle. The screened floatables baffle may allow for the complete or at least partial separation of trash and debris from fluid entering other parts of the system.

The vault enclosure includes a lower floor 105 and an upper floor 106 that is located above the lower floor. As shown in the embodiment of FIG. 1, the lower floor may form a bottom surface along an outside of the vault enclosure. The upper floor may be formed from a variety of structures that are known in the art to allow for the construction of watertight compartments in stormwater management systems, including without limitation one or more solid slabs, raised surfaces, or "false floors" located within the inlet bay. A void space is located between the lower and upper floors (i.e., below the upper floor and above the lower floor) to form an underdrain along a lower portion of the vault. The void space provides another route for fluid flow from and within the inlet bay.

Figure 2:
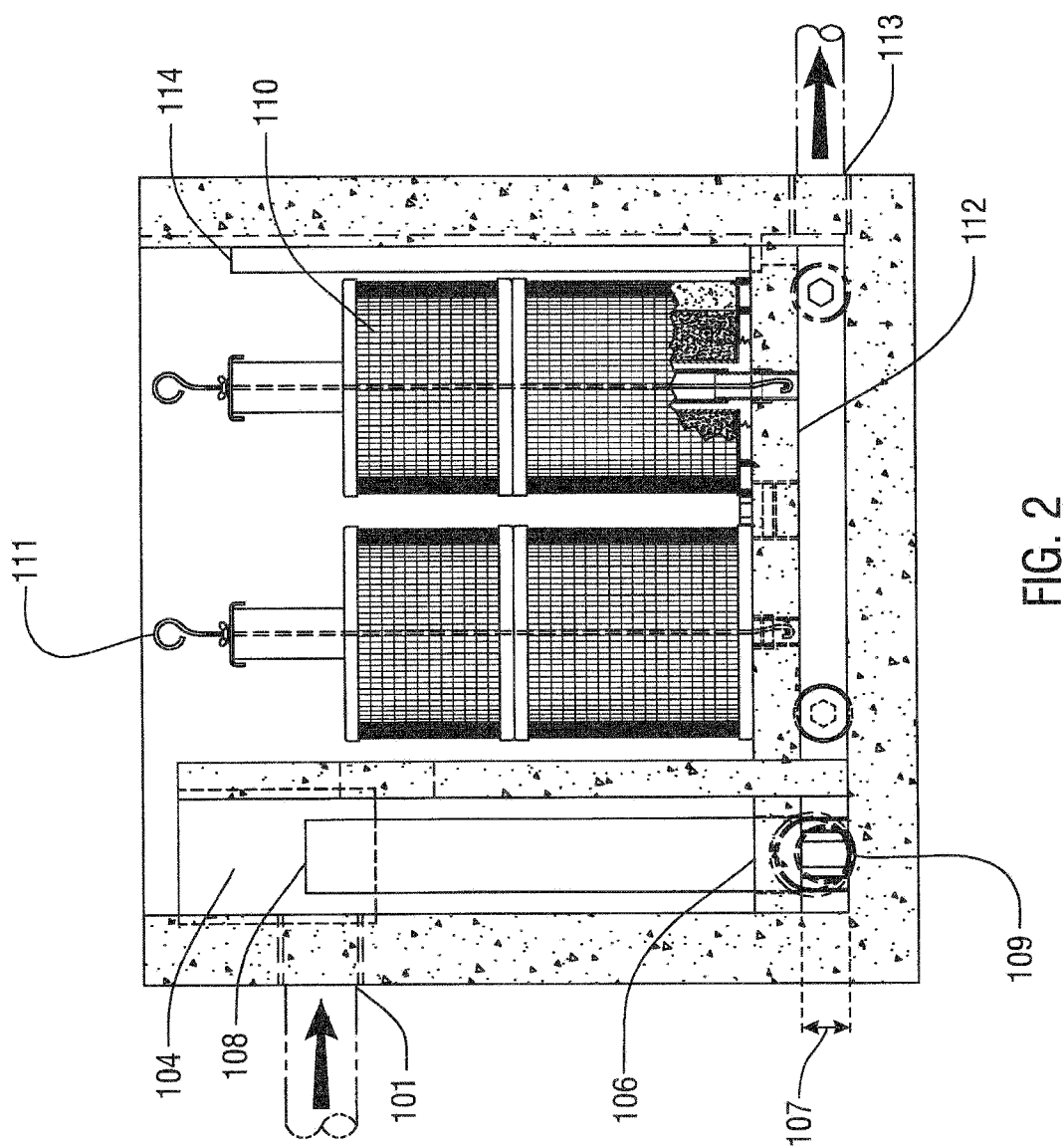
FIG. 2 illustrates schematically a side sectional view showing internal components of a stormwater treatment system in accordance with one embodiment of the present invention.
Figure 3:
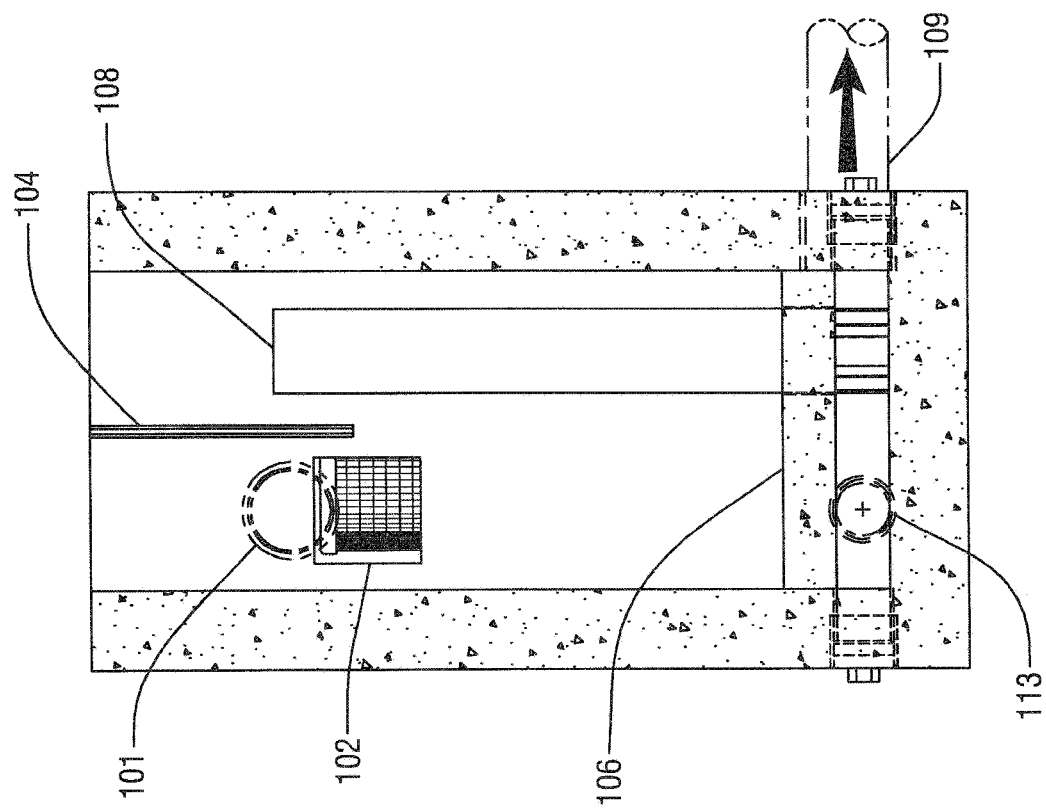
FIG. 3 illustrates schematically a front sectional view showing internal components of a stormwater treatment system in accordance with one embodiment of the present invention.
Figure 4:
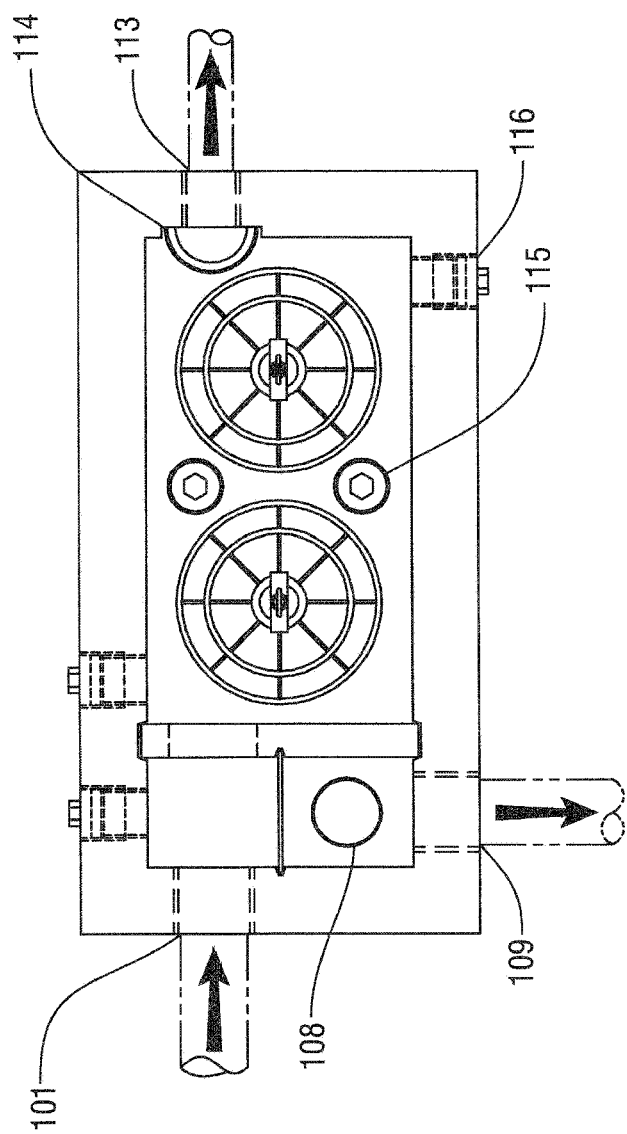
FIG. 4 illustrates schematically a top sectional view showing internal components of a stormwater treatment system in accordance with one embodiment of the present invention.

In the embodiment illustrated in FIG. 2, the system may include underdrain 107 that is approximately the same in thickness as the upper floor. This embodiment is provided as a non-limiting example, however. One or more underdrains of other relative shapes and dimensions (or varying heights) may be incorporated in the system. Its dimensions may vary depending on factors such as, without limitation: the desired capacity of the system, the desired rate of fluid flow, ease of construction, geometries and locations of the other components of the system, and the overall structural requirements for the system.

In some embodiments, the lower floor may comprise a solid slab that is impermeable to fluid flow. The lower floor may comprise an open structure or a bottom structure with one or more permeable regions to allow for infiltration. In some embodiments, the lower floor also may be adapted for use with an underdrain layer, such as a gravel layer. The stormwater management system also may be used with one of various optional liners, to adjust the infiltration rates to the surrounding soils. For example, the liner may be semi-permeable and be constructed of a geotextile or other fabric. In other embodiments, the lower floor may comprise a combination of two or more of these features.

A substantially vertical bypass pipe 108 extends from the inlet bay through the upper floor and into the void space to allow for fluid flow into the void space. In this embodiment, the bypass pipe forms a substantially circular weir overflow bypass in an interior of the inlet bay, preferably separate from and away from the walls of the inlet bay. The bypass pipe may be formed from any conventional pipe that can be easily sourced and allows for both visibility and access around the area of the pipe (e.g., for maintenance and repair purposes), including without limitation a conventional vertical standpipe or a PVC pipe. The bypass pipe is preferably dimensioned and positioned so that the uppermost opening in the top of the pipe is located at an elevation higher than the uppermost opening in the top of the inlet window. Fluid flowing below the top of the bypass pipe is allowed to flow through the inlet window and to the cartridge area. Although shown here with substantially rounded walls, the bypass pipe may be formed from fluid conveyance structures of various shapes and surfaces that are known in the art to provide a watertight route for fluid flow.

As shown in this embodiment, the bypass pipe is a separate structure, separate from the baffle wall. Moreover, in this embodiment, the bypass pipe is not in direct contact with the baffle wall, thereby providing a space (for access, cleaning, and maintenance, for instance) between the bypass pipe and the baffle wall. The bypass pipe may be removed from the vault, cleaned, and/or replaced with another pipe without disrupting the other components of the system. The inlet opening, inlet window, and bypass pipe need not be positioned in a straight line within the inlet bay. For example, the bypass pipe may be positioned anywhere within the interior of the inlet bay (e.g., directly in front of, to the side of, or next to an edge of the inlet window).

An optional bypass outlet structure, such as a bypass pipe 109, extends from the void space below the upper floor to allow for fluid flow from the void space through a sidewall of the inlet bay or the vault. In some embodiments, the bypass pipe is a continuous structure or series of structures that extends through the void space and connects to the bypass outlet. The bypass pipe may be connected to a bypass outlet using a pre-bent pipe or tube, such as a standard pipe elbow. In a preferred embodiment, one or more notches may be cut along the bottom of the bypass pipe, below the upper floor, to provide structural support for the pipe and to allow the bypass pipe to stand on support legs. The notches also are advantageous in that they can retain debris within the system in the course of screening and delivery of the fluid to the void space. In a preferred embodiment, the bypass outlet opening may include a PVC coupler to facilitate connection to an external piping or other fluid conveying structure outside the vault enclosure.

Figure 5:
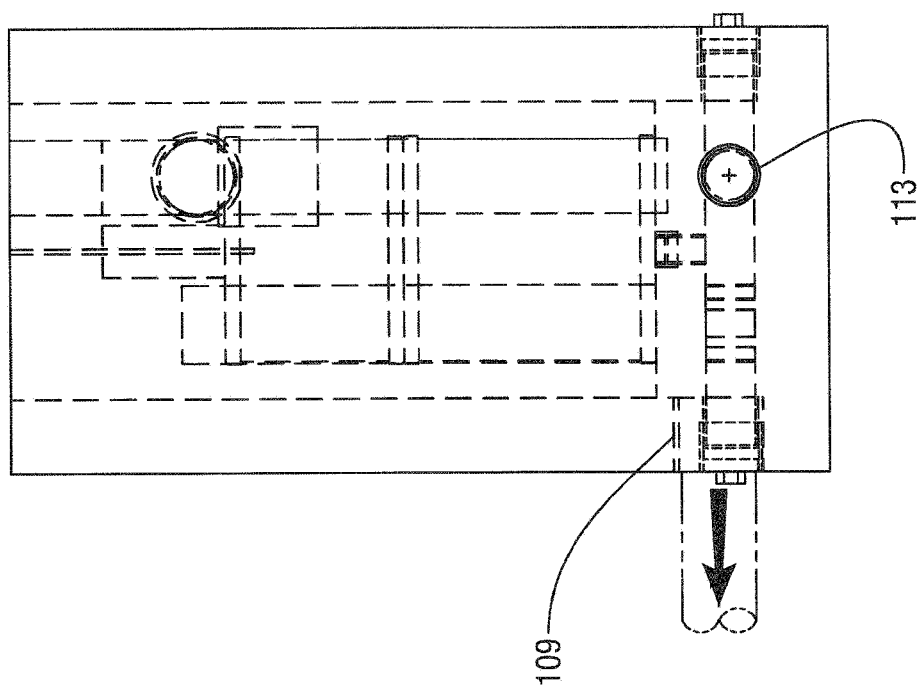
FIG. 5 illustrates schematically a back sectional view showing internal components of a stormwater treatment system in accordance with one embodiment of the present invention.

A cartridge bay adjacent to the inlet bay includes one or more media filtration cartridges 110. The filtration cartridge includes one or more openings in fluid communication with one or more openings in the upper floor to allow for fluid flow from the filtration cartridge to the void space below the upper floor. An optional connecting structure, such as a hold-down hook and rod assembly 111, helps to secure the media filtration cartridges within the area. As shown in FIGS. 1 and 2, the cartridge bay includes an upper floor 112 and a void space below the upper floor. The upper floor is located above the enclosure floor 105. (As will be described, in some embodiments, the upper floor in the cartridge area may be continuous with the upper floor in the inlet area and be formed from a single floor slab.) An outlet structure 113 extends from the void space below the cartridge bay through an opening in the sidewall and to the outside of the bay. In a preferred embodiment, the outlet structure may include a PVC coupler to facilitate connection to an external piping or other fluid conveying structure located outside the vault enclosure. The coupler may be cast monolithically with the vault enclosure. Outlet structures are shown in far-side and nearside views in FIGS. 3 and 5, respectively.

The cartridge bay may also include one or more optional access openings to allow for cleaning, maintenance, repair, and venting. In this embodiment, a half-round outlet vent pipe 114 is positioned at a corner of the treatment chamber. One or more threaded PVC clean-out ports 115 may be located along the lower floor of the cartridge bay. One or more additional threaded PVC clean-out ports 116 may be located along a wall on the cartridge bay side. The clean-out ports allow access for periodic maintenance, inspection, flushing, and repair of the system; for example, when a filtration cartridge is clogged or otherwise obstructed. The vault also may include one or more cover panels (not shown) with optional access openings along a top of the vault.

The filtration cartridges may include any filtration media that are known in the art for processing stormwater. In this embodiment, the system uses conventional cartridges containing media known to capture and retain sediments, oils, metals and other target constituents and to reduce the total discharge load. In a preferred embodiment, a filtration cartridge may be manufactured from durable polymeric components, including a polymer-coated steel support screen and stainless steel hardware. Its base construction allows use with a wide variety of media chosen to address site-specific pollutants of concern.

The number of filtration cartridges used in the system, as well as the sizes, dimensions and placement of the cartridges within the system may vary depending on one or more design factors including but not limited to: the desired overall size and shape of the assembly, levels and types of contamination, types of pollutants present in the water, desired load-bearing tolerance for assembly, desired amount of water flow to be managed, treatment capacity of each cartridge, number and location of inlet and outlet pipes, and/or the desired access space for inspection and maintenance purposes. Other types of filtration media (with or without cartridge systems) may also be used with the stormwater management system.

As shown in the embodiment of FIG. 1, the baffle wall extends below the upper floor to separate the outlet void space under the inlet bay from the outlet void space under the cartridge bay. This configuration allows for the isolation and separate sampling of bypass and treated flows. In other embodiments, the baffle wall ends at or near a top or bottom surface of the upper floor. In that configuration, the void space comprises a continuous chamber that extends along a bottom portion of the vault, below both the inlet and cartridge bays. This configuration allow for commingled bypass and treated flows from the inlet and cartridge bays, respectively. Thus, fluid from the void spaces under the inlet and cartridge bays may be conveyed using a single outlet structure such as an outlet pipe or coupler, rather than separate outlet structures that convey fluid from the inlet and treatment areas.

Figure 6:
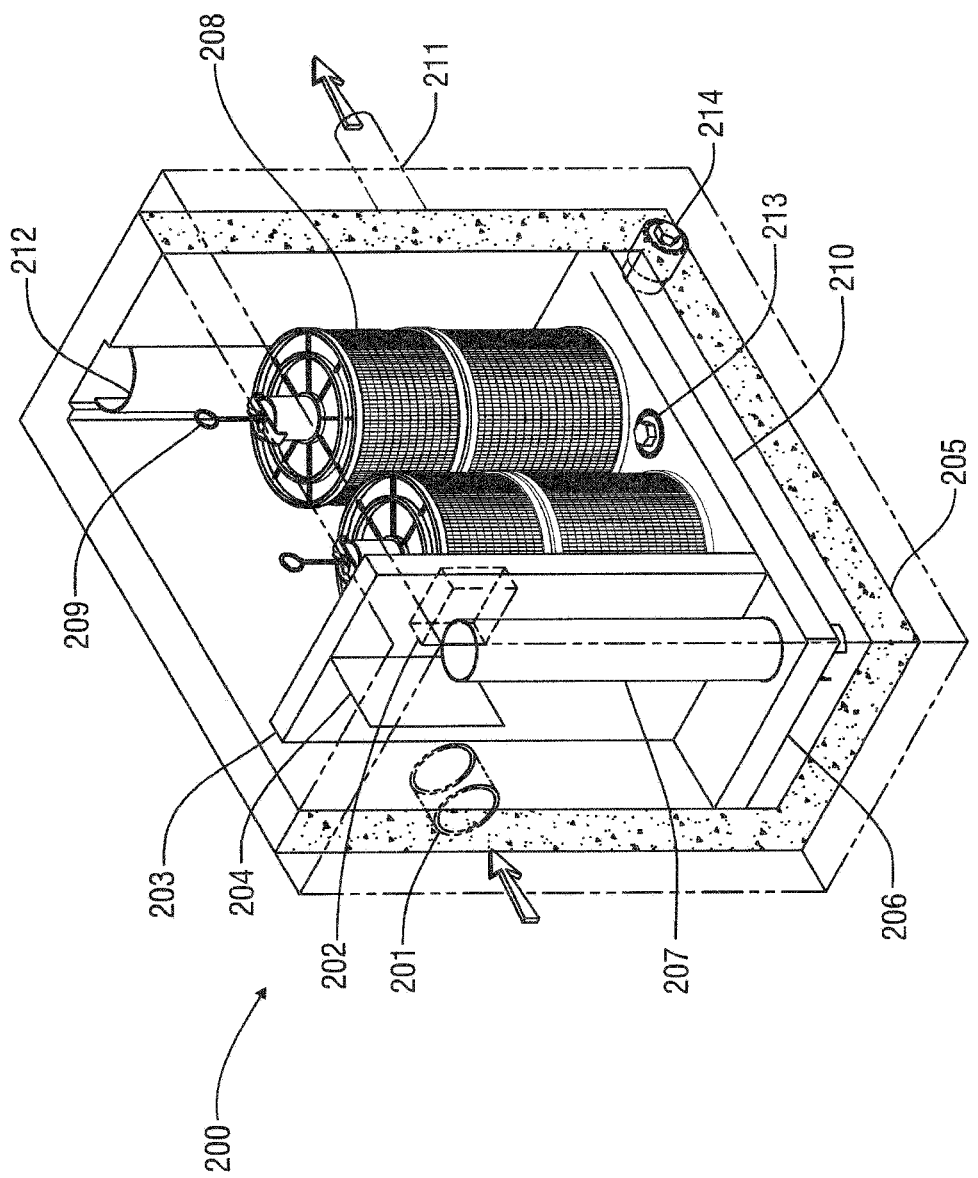
FIG. 6 illustrates schematically a cutaway view of a stormwater treatment system in accordance with one embodiment of the present invention.

For example, as shown in FIG. 6, a stormwater management system 200 includes a substantially rectangular-shaped vault enclosure. An inlet bay is located along a front side of the enclosure. A cartridge bay is located downstream from the inlet bay, along a back side of the enclosure. The inlet bay includes an inlet structure, such as an inlet coupler 201, that extends from the outside of the inlet bay through a sidewall in the inlet bay. An inlet window 202 is located along a baffle wall 203. A screened floatables baffle 204 is also positioned along the baffle wall. In this embodiment, the screened floatables baffle is positioned substantially perpendicular to the baffle wall. The vault enclosure includes a lower floor 205 and an upper floor 206 that is located above the lower floor. A void space is located between the lower and upper floors. Here, the void space extends across a length of the vault enclosure to provide a continuous route for fluid flow from the inlet bay through the bottom of the vault enclosure. A substantially vertical bypass pipe 207 extends from the inlet bay through the upper floor and into the void space to allow for fluid flow into the void space.

The cartridge bay includes one or more media filtration cartridges 208. The filtration cartridge includes one or more openings in fluid communication with one or more openings in the upper floor to allow for fluid flow from the filtration cartridge to the void space below the upper floor. An optional connecting structure, such as a hold-down hook and rod assembly 209, helps to secure the media filtration cartridges within the area. The cartridge bay also includes an upper floor 210 (which, in this embodiment, is monolithically cast with the upper floor of the inlet bay) and a void space below the upper floor. An outlet structure 211 extends from the void space below the cartridge bay through an opening in the sidewall and to the outside of the bay. The outlet structure allows for the release of commingled bypass and treated flows from the vault enclosure. The cartridge bay may also include one or more optional access openings to allow for periodic cleaning, maintenance, repair, and venting; including without limitation, a half-round outlet vent pipe 212 positioned at a corner of the treatment chamber. One or more threaded PVC clean-out ports 213 may be located along the lower floor of the cartridge bay. One or more additional threaded PVC clean-out ports 214 may be located along a wall of the cartridge bay.

In an embodiment, a vault measures on the outside approximately 69 inches in length and 36 inches in width (exterior dimensions). With approximately 6-inch thick walls, the interior of the vault measures approximately 57 inches in length and 24 inches in width (interior dimensions). The inlet bay is approximately 10 inches in length with an approximately 3-inch thick baffle wall. The cartridge bay is approximately 44 inches in length. The inlet window measures approximately 8 inches on each side and is located from its lowest point, approximately 27.25 inches above the upper floor. The lower floor is approximately 6 inches thick, and the upper floor is approximately 4 inches thick. A 6-inch (outer diameter) PVC bypass weir pipe extends approximately 36.25 inches above the upper floor. An approximately 4-inch high void space extends along a bottom of the vault. The inlet may be constructed of a 6-inch (outer diameter) PVC coupler cast monolithic with the vault. The outlet may be constructed of a 4-inch (outer diameter) PVC coupler cast monolithic with the vault. The sizes, shapes, and dimensions discussed here are provided as merely as examples and are not intended to limit the scope of the invention. The stormwater management system and its components may be constructed of various sizes, including systems with dimensions larger (or smaller) than those described above. It will be appreciated that the sizes, shapes, and dimensions of the stormwater management system, its components, and the various compartments may vary depending on the needs of a particular site or landscape project.

It also will be appreciated that multiple paths for fluid flow through the system may be provided. For example, a flow path directs treated flows through the inlet bay and from the inlet bay to the cartridge bay. Another flow path provides an alternate route for the release of overflow fluid from the inlet bay. That latter path is particularly useful for processing stormwater when the stormwater flow rate exceeds the capacity of the treated flow path.

Figure 7:
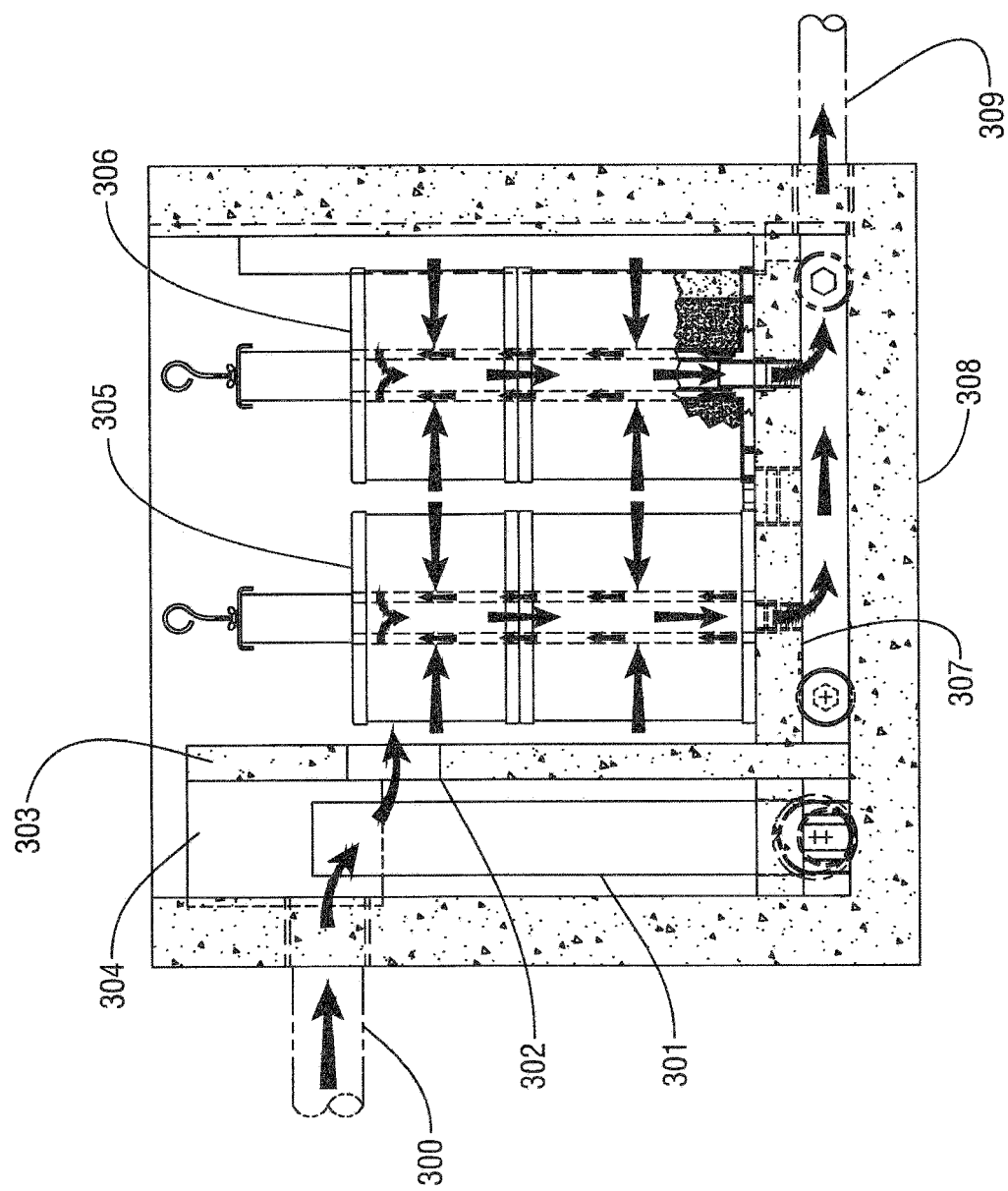
FIG. 7 illustrates schematically a side sectional view showing internal components of a stormwater treatment system in accordance with one embodiment of the present invention. The arrows indicate a direction in which treated stormwater may flow through the system.

FIG. 7 illustrates a treated flow path according to one embodiment of the present invention. Arrows are used to show the direction of treated fluid flow in the system. The system includes an inlet bay and a filtration cartridge bay downstream from the inlet bay. Stormwater is allowed to enter the inlet bay through the inlet 300. In the inlet bay, the stormwater flows past the bypass pipe 301 and through the inlet window 302 in the baffle wall 303, into the cartridge bay. A screened floatables baffle 304 may be provided to assist with retaining floatables, such as gross pollutants, debris, and the like, in the inlet bay to prevent their release with the treated flows. After entering the cartridge bay, the stormwater is allowed to contact filtration media, shown here as being contained in filtration cartridges 305, 306, and pollutants are separated from the stormwater. Treated flows are allowed to flow into and through the filtration cartridges, through and past the secondary floor 307 above the primary vault floor 308, and through a void space beneath the cartridge bay. The treated flows then exit the system through an outlet structure 309.

FIG. 8 illustrates a bypass flow path according to one embodiment of the present invention. Arrows are used to show the direction of bypass fluid flow in the system. As illustrated, the system includes an inlet bay and a filtration cartridge bay downstream from the inlet bay. Fluid from the inlet opening 400 enters the inlet bay and is allowed to accumulate in the inlet bay. When the fluid has accumulated above the height of the inlet window 401 (located along the baffle wall 402), at least a portion of the fluid is permitted to flow past the screened floatables baffle 403 and into the bypass pipe 404. The bypass pipe extends through an opening in the upper floor to convey the fluid into a void space above the lower floor and below the upper floor. The bypass pipe allows for fluid flow through the void space along a bottom portion of the vault. The untreated flow is then released from the system through bypass outlet 405. In this embodiment, one or more notches are cut to form support legs along the bottom of the bypass pipe to provide structural support for the pipe. In this embodiment, the height of the bypass pipe is located above the highest point of the inlet window opening to provide an alternate flow path for fluid in the inlet bay.

The above descriptions are merely illustrative examples of the various stormwater management system components and assemblies in some embodiments of the invention. While possible configurations, pipe couplings, and general chamber shapes are shown in the figures, it is within the scope and contemplation of the invention to introduce assemblies in other configurations using different pipe couplings, chamber configurations, and shapes. The ordinary artisan will recognize that the design may be modified in accordance with the needs of a particular landscape site or project.

It will be appreciated that the stormwater management system of the present invention may be modular and scalable. In addition, the vault chambers, bays, pods, and/or compartments may be placed in different configurations and orientations in accordance with other embodiments of the present invention. For example, in some embodiments, the stormwater management system may include additional compartments or bays to admit, handle, store, process, or release flow and/or filtration within the system. Additional treatment bays (with additional filtration media) may be used when increased filtration is required. Additional inlet, treatment, and or other types of intermediate bays may be included to process, pretreat, treat, store, filter, or otherwise handle stormwater flowing through the system.

Further, the compartments described in this invention may be separated by one or more intermediate chambers to allow for additional treatment, water storage, gross pollutant retention, or and/or fluid flow. In some embodiments, the stormwater management system may allow for additional pretreatment of stormwater either through internal or external structures to prolong the life of the filtration media and simplify maintenance by removing at least some of the gross pollutants in a separate area.

In some embodiments, the inlet and cartridge bays, as well as the corresponding inlet and outlet openings, may be positioned along different parts of the vault and on different sidewalls, to accommodate flow from different surfaces and areas. The inlet bay, for example, could be positioned along a corner of the vault. The inlet and/or cartridge bays may be positioned above other compartments in a multi-compartment vault. In some embodiments, the bypass flows may be directed along other areas of the vault (along a side or intermediate space within the vault, for example). The placement and layout of the various compartments within the enclosure may vary depending on one or more design factors including but not limited to: ease of fabrication, desired amount of water flow to be managed, desired overall size of the assembly, location and configuration of downstream processing assemblies, desired load-bearing tolerance for assembly, number and location of inlet and outlet pipes, number and location of pre-treatment zones and filtration systems, alignment with surface structures, and/or the desired access space for inspection and maintenance purposes.

In addition, the quantities, sizes, shapes, and dimensions discussed above are provided for illustrative purposes and are not intended to limit the scope of the invention. It will be appreciated that the quantities, shapes, sizes, and dimensions of the system compartments and their components may vary depending on factors such as: the water management application, the characteristics of the material used for construction, the overall dimensions of the system (e.g., different enclosure widths, lengths, and heights (outside and inside dimensions)), the desired weights, the desired infiltration capacity, the desired treatment capacity, the desired media to be used, desired filtration, and/or the desired flow rates through the system.

For example, the sizes, shapes, and quantities of the openings and passages may be adjusted to accommodate different flow rates. Similarly, the number of openings may be enlarged or scaled down to allow for increased or decreased stormwater flow, respectively. Multiple bypass pipes (of the same or differing sizes) may be incorporated to allow for increased bypass flows rates. As discussed, different types and numbers of filtration cartridges (and types of filtration media) also may be used. Additional inlet and/or outlet structures also may be incorporated to direct flows for subsequent treatment, sampling, or storage. The use of multiple inlet and/or outlet structures provides additional options for flow into and out of the system. The position of the inlet and outlet structures (e.g., raised or lowered) may be adjusted for added flexibility.

In some embodiments, it may be desirable to incorporate outer walls, baffle walls, and floor surfaces of different shapes and sizes. For example, it may be desirable to incorporate outer walls, baffle walls, or floor surfaces with substantially straight inner and outer weir walls for ease of construction and use. In other embodiments, the walls or floor surfaces may include both substantially curved and substantially straight portions to accommodate internal components and/or filtration media of different shapes. In yet other embodiments, it may also be desirable to incorporate compartments with a different number of walls that combine to form a variety of shapes formed from a variety of different surfaces (e.g., rectangular, square, circular, multi-sided, and/or irregular).

Simple and more complex systems of multiple interconnected structures can be built that provide sufficient load bearing strength and structural integrity for a wide range of underground water management applications. For example, multiple chambers may be included within an enclosure for increased flow capacity and enhanced treatment. Additional chambers may be connected to allow for modular systems that may be expanded or scaled-down to accommodate different stormwater flow rates. The same system or chamber assemblies may be adjoined for increased filtration capabilities. Moreover, the systems may be adjoined with other filtration systems and devices.

Additional features may be incorporated into the chamber assemblies, such as a wide range of cartridges and other filtration media, other water filtration systems, pre-treatment structures, and other bypass features. In addition, flow control devices may be incorporated to measure, control, and adjust, as needed, the rate of fluid flow within and through the system and its particular components. The stormwater management system may be used with additional external structures, such as one or more external catch bins for bypass flows or one or more pretreatment devices. The variation in the types and features allows for customization according to the particular needs of a landscape area.

The features described in this invention may be adjustable and removable to facilitate customization, allow for component replacement, and enhance design flexibility. For example, the inlet and cartridge bays may include with one or more removable screens or filtration devices. Also, various plugs or closures may be used to isolate compartments during use. For example, for areas in which the flow is anticipated to remain within the flow capacity of the system, the bypass pipe may be removed and/or the bypass openings may be sealed so that the system may be used without the internal bypass feature. In other embodiments, external bypass units may be added to accommodate peak flows, and bypass flows would continue downstream from the vault.

The ordinary artisan will recognize that the absolute dimensions of the holes, slots, and openings can be selected to accept industry standard pipe connections/fittings (e.g., rubber boots). Any of a multitude of complementary shapes allowing fluid flow through the module and well known to the ordinary artisan could be used. Such fittings can offer flexible and watertight connections between modular components and piping for controlling water flow into and out of an assembly of modular components.

The ordinary artisan also will recognize that materials commonly used in applications involving underground stormwater management systems can be employed. For example, in various embodiments of the present invention, materials useful for construction include but are not limited to: concrete, precast concrete, polypropylene, high-density polyethylene (HDPE), low-density polyethylene (LDPE), rubber, aluminum or any other materials that can be molded or cast for water loading. Further, the vault system of the present invention may be constructed as a one-piece design that provides structural integrity and integral foundation. Alternatively, it can be constructed of separate units that are assembled to form the system.

The above disclosures are sufficient to enable one of ordinary skill in the art to practice the invention, and provide the best mode of practicing the invention presently contemplated by the inventors. While there is provided herein a full and complete disclosure of specific embodiments of this invention, it is not desired to limit the invention to the exact construction, dimensional relationships, and operation shown and described. Various modifications, alternative constructions, design options, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. An apparatus for stormwater management comprising:
   (a) a vault comprising upper and lower floor slabs;
   (b) a first compartment disposed within the vault and comprising: a bypass pipe extending through the upper floor slab, a baffle wall adjacent to the bypass pipe, a screened floatables baffle attached to the baffle wall, and a fluid-conveyance opening disposed along the baffle wall; wherein the top of the bypass pipe is located above the top of the fluid conveyance opening;
   (c) a second compartment in fluid communication with the first compartment through the fluid-conveyance opening, wherein the second compartment is adapted to incorporate a filtration cartridge; and (d) an underdrain defined at least in part by the upper and lower floor slabs of the vault, wherein the underdrain is disposed below and in fluid communication with the first compartment through the bypass pipe.

2. The apparatus of claim 1, wherein the underdrain is disposed below and in fluid communication with the second compartment.

3. The apparatus of claim 1, wherein the underdrain comprises a continuous fluid flow path under the first and second compartments.

4. The apparatus of claim 1, wherein the underdrain extends between opposite sidewalls of the vault and terminates at an outlet of the vault.

5. The apparatus of claim 1, wherein the bypass pipe comprises a structural support notch along a bottom portion.

6. The apparatus of claim 1, wherein the bypass pipe comprises a removable pipe.

7. An apparatus for stormwater management comprising:
(a) a vault comprising an inlet, an outlet downstream from the inlet, filtration media disposed between the inlet and outlet, a primary floor disposed along a lower region of the vault, and a secondary floor disposed above the primary floor;
(b) a lower channel formed at least in part by the primary and secondary floors of the vault, and terminating at the outlet;
(c) a baffle wall located along an interior of the vault and upstream from the filtration media, wherein the baffle wall comprises a fluid-conveyance window adapted to direct fluid from the inlet to the filtration media; and
(d) a standpipe located adjacent to the baffle wall and extending through the secondary floor, wherein the standpipe comprises a top opening adapted to direct fluid from the inlet to the lower channel.

8. The apparatus of claim 7, wherein the highest point of the fluid-conveyance opening is located below the top opening of the standpipe.

9. The apparatus of claim 7, wherein the lower channel is in fluid communication with the filtration media.

10. The apparatus of claim 7, wherein the lower channel provides a continuous flow path for fluid flowing from the standpipe and from the filtration media.

11. The apparatus of claim 7, wherein the lower channel extends between opposite sidewalls of the vault.

12. The apparatus of claim 7, further comprising a screened floatables baffle attached to the baffle wall.

13. The apparatus of claim 7, wherein the standpipe pipe is removable.

14. The apparatus of claim 7, wherein the filtration media comprises a filtration cartridge.

15. A method for processing stormwater comprising:
(a) directing stormwater through an inlet of a vault comprising upper and lower floor slabs;
(b) flowing the stormwater from the inlet into a first compartment comprising: a bypass pipe extending through the upper floor slab, a baffle wall adjacent to the bypass pipe, and a fluid-conveyance opening disposed along the baffle wall;
(c) flowing at least a portion of the stormwater accumulating below a top portion of the bypass pipe into a second compartment, wherein the second compartment comprises a filtration cartridge;
(d) flowing at least a portion of the stormwater accumulating above the top portion of the bypass pipe through the bypass pipe and into an underdrain defined at least in part by the upper and lower floor slabs of the vault; and
(e) releasing the stormwater from the first and second compartments through an outlet in fluid communication with the underdrain.

16. The method of claim 15, wherein the top portion of the bypass pipe is located above the top portion of the fluid conveyance opening.

17. The method of claim 15, wherein the underdrain is disposed below and in fluid communication with the second compartment.

18. The method of claim 15, wherein the underdrain comprises a continuous fluid flow path under the first and second compartments.

19. The method of claim 15, further comprising the step of removing gross pollutants using a screened floatables baffle attached to the baffle wall in the first compartment.

20. The method of claim 15, wherein the bypass pipe comprises a structural support notch along a bottom portion.

* * * * *